(12) United States Patent
Unruh (10) Patent No.: US 9,626,429 B2
(45) Date of Patent: Apr. 18, 2017

(54) TEXT ENTRY WITH WORD PREDICTION, COMPLETION, OR CORRECTION SUPPLEMENTED BY SEARCH OF SHARED CORPUS

(75) Inventor: Erland Unruh, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 128 days.

(21) Appl. No.: 12/943,856

(22) Filed: Nov. 10, 2010

(65) Prior Publication Data

US 2012/0117101 A1    May 10, 2012

(51) Int. Cl.
*G06F 17/30* (2006.01)
*G06F 3/023* (2006.01)
*G06F 17/27* (2006.01)

(52) U.S. Cl.
CPC ........ *G06F 17/3064* (2013.01); *G06F 3/0237* (2013.01); *G06F 17/273* (2013.01); *G06F 17/276* (2013.01)

(58) Field of Classification Search
CPC .................................................. G06F 17/3064
See application file for complete search history.

(56) References Cited

U.S. PATENT DOCUMENTS

| | | | |
|---|---|---|---|
| 2004/0002994 A1* | 1/2004 | Brill ....................... | G06F 17/273 |
| 2004/0054661 A1* | 3/2004 | Cheung ............. | G06F 17/30864 |
| 2005/0114114 A1* | 5/2005 | Rudolph ......................... | 704/10 |
| 2005/0289141 A1* | 12/2005 | Baluja .............................. | 707/6 |
| 2006/0005240 A1* | 1/2006 | Sundarrajan et al. ......... | 726/15 |
| 2006/0190436 A1* | 8/2006 | Richardson et al. ............ | 707/3 |
| 2006/0195435 A1 | 8/2006 | Laird-McConnell | |
| 2006/0294050 A1 | 12/2006 | McRoberts et al. | |
| 2007/0005797 A1* | 1/2007 | Fontijn .................. | G06F 21/10 709/238 |
| 2008/0126073 A1 | 5/2008 | Longe et al. | |
| 2009/0077072 A1 | 3/2009 | Kraft | |
| 2010/0114887 A1 | 5/2010 | Conway et al. | |
| 2010/0306229 A1* | 12/2010 | Timm ................. | G06F 17/3064 707/767 |

FOREIGN PATENT DOCUMENTS

| | | |
|---|---|---|
| CN | 101645065 A | 2/2010 |
| KR | 10-2007-0072844 A | 7/2007 |

* cited by examiner

*Primary Examiner* — Syed Hasan
(74) *Attorney, Agent, or Firm* — Perkins Coie LLP (57) ABSTRACT

Searching a shared corpus is used to supplement word prediction, completion, and/or correction of text entry. A user input device at a client device receives user entry of text input comprising a string of symbols. The client device wirelessly transmits instructions to a remote site to conduct a search of a corpus using the string as a contiguous search term. From the remote site, the client device receives results of the search, including multiple sets of one or more words, each set occurring in the corpus immediately after the search term. The client device uses the received sets in word prediction, completion, and/or correction.

24 Claims, 4 Drawing Sheets

TEXT ENTRY WITH WORD PREDICTION, COMPLETION, OR CORRECTION SUPPLEMENTED BY SEARCH OF SHARED CORPUS

BACKGROUND

1. Field of the Invention

The invention relates to handheld computing devices with user operated text entry. More particularly, the invention concerns techniques for more accurately and efficiently predicting and/or correcting user entered text.

2. Description of the Related Art

Handheld digital devices are becoming increasingly widespread. Some digital devices are dedicated to simpler tasks, as in the case of a television remote control. Other devices offer general purpose computing platforms, as in the case of personal data assistants (PDAs). Other devices offer a combination of these, as in the case of many mobile telephones, which place and receive calls, but also perform address management, web surfing, text messaging, and other computing functions.

Some handheld computers offer a full keyboard, albeit considerably reduced in size, while many others do not. Many mobile phones only come with a simple keypad of twelve keys. Lacking a full keyboard or a full-sized keyboard, there are considerably more opportunities for user error while entering data. Also, data entry is usually slower with these devices.

Accordingly, being constrained with a reduced keyboard presents many challenges in designing text entry user interfaces for that are simple, intuitive, fast, and powerful.

SUMMARY OF THE INVENTION

Searching a shared corpus is used to supplement word prediction, completion, and/or correction of text entry. A user input device at a client device receives user entry of text input comprising a string of symbols. The client device wirelessly transmits instructions to a remote site to conduct a search of a corpus using the string as a contiguous search term. From the remote site, the client device receives results of the search, including multiple sets of one or more words, each set occurring in the corpus immediately after the search term. The client device uses the received sets in word prediction, completion, and/or correction. The invention may be implemented as one or more modules of hardware, software, firmware, circuitry, or a combination of these.

DETAILED DESCRIPTION

The nature, objectives, and advantages of the invention will become more apparent to those skilled in the art after considering the following detailed description in connection with the accompanying drawings.

Hardware Components and Interconnections

Overall Structure

Introduction

Figure 1:
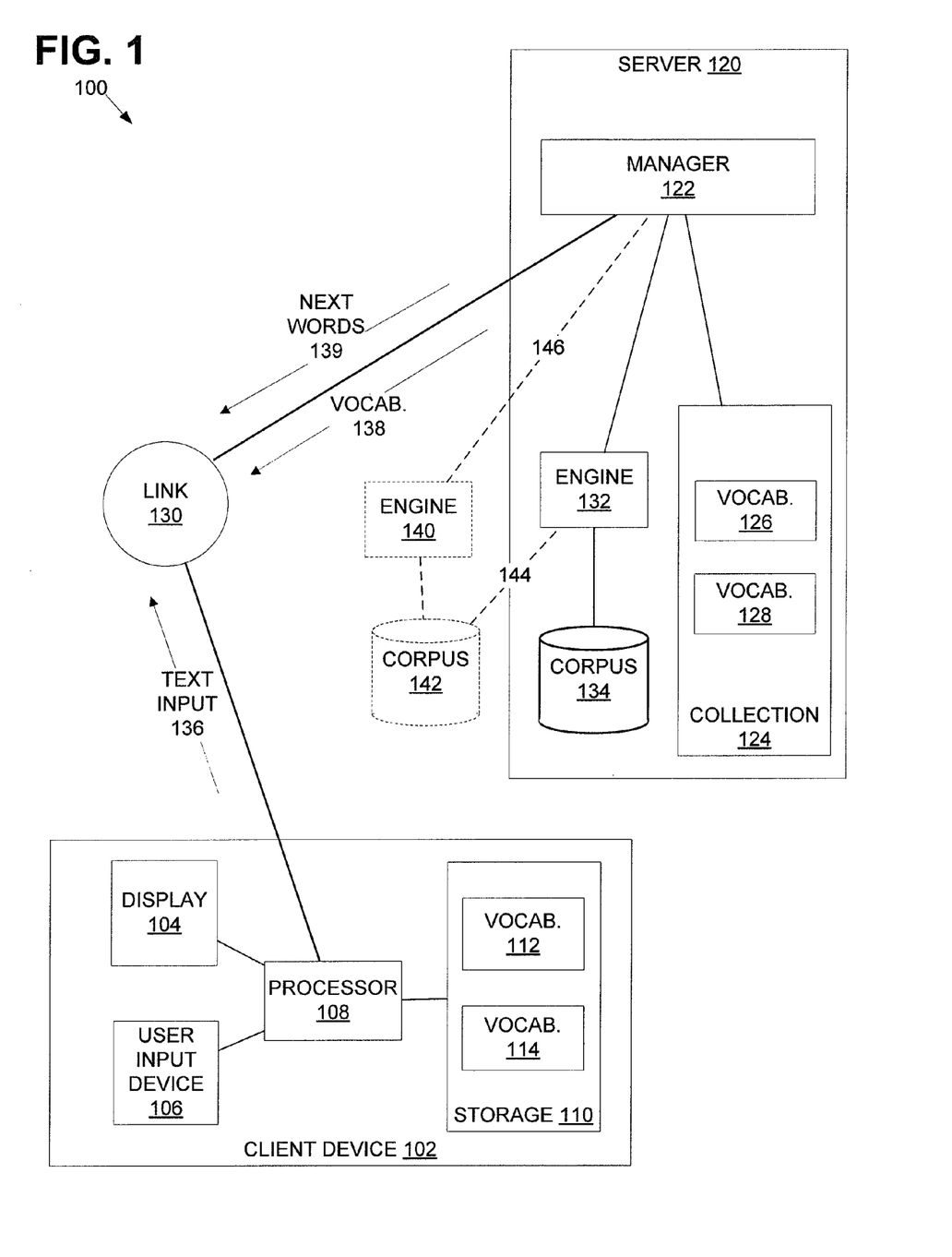
FIG. 1 is a block diagram of the components and interconnections of an environment for text entry with word prediction, completion, and/or correction supplemented by search of shared corpus according to one embodiment of the invention.

One aspect of the present disclosure concerns various equipment for use to practice text entry with word prediction, completion, and/or correction supplemented by searching a shared corpus. FIG. 1 shows an exemplary environment or system 100 in which this equipment may be implemented. Broadly, the system 100 includes one or more mobile computing devices such as a client device 102 coupled to one or more servers such as 120 by one or more links such as 130.

This disclosure makes numerous references to "words," however this is merely for ease of description and without any intended limitation. The disclosure may be applied to numerical sequences, logographic characters, and any string or other assembly of symbols without limitation.

Mobile Computing Device

The client device 102 may also be referenced by other names, such as a handheld device, a mobile computer, mobile computing device, user device, or any other such term without any intended limitation. In an actual implementation of the system 100, there are many devices such as 102, however for ease of explanation, only the single client device 102 is illustrated. The client device 102 may be implemented a variety of handheld computing devices such as a PDA, mobile telephone, radio, slate computing device, GPS, etc.

The client device 102 includes a processor 108, the construction of which is explained in greater detail below. The client device 102 also includes a display 104, such as a thin film transistor liquid crystal or other LCD, plasma, CRT, or other device for visually presenting machine-readable input representing at least text and graphics. Although referred to in the singular for ease of reading, there may be multiple displays 104 if appropriate to the manner in which the client device 102 is being implemented. In one example, the display 104 is integrated into the client device 102, as is common for mobile telephones.

The client device 102 also includes a user input device 106, with one example comprising a typing mechanism for the user to enter symbols by pressing physical or virtual buttons representing symbols. Some examples include a reduced-size keyboard, nine key or twelve key or other keypad, telephone keypad, and the like. Another example of device 106 is a touch-sensitive display screen operable with a "soft" keyboard or keypad presented in the display 104. Furthermore, besides typing input devices, the device 106 may also include equipment to receive user input by handwriting, sound, voice, eye gaze tracking, brain waves, or any other mechanism. Although referred to in the singular for ease of reading, the device 106 may concurrently include multiple user input mechanisms.

The client device 102 also includes storage 110, which in this example is local to the client device 102 and coupled to the processor 108. The construction of the storage 110 is described below in the context of several examples. In the illustrated example, the storage 110 includes local vocabularies 112, 114. These local vocabularies are used, among other functions, to assist in performing word prediction, completion, and/or correction. Different vocabularies may pertain to different languages, subject matter, or other topics or functional purposes or content.

Link

As mentioned above, the client device 102 is coupled to the server 120 by one or more links such as 130. In one example, the link 130 is embodied by the public Internet, and additionally: (1) where the client device 102 is coupled to the public Internet by a wireless broadband connection such as wireless local area network (WLAN), wireless broadband, mobile broadband, or other wireless high-speed Internet access, and (2) where the server 120 is coupled to the public Internet by hardware such as routers, modems, and the like. This example is given without any intended limitation, however, as the link 130 may be implemented by virtually any wired or wireless technology for forming a communications link between computing devices, such as light or electricity conductive wires or cables, satellite, public switched telephone network, local area network, or other suitable technology or a combination of these.

Server

The server 120 comprises a computer configured to receive requests from client devices 102 via the link 130, carry out searches and other data management tasks, and return requested data to the client devices 102. In this regard, the server 120 comprises one or more computers that run various services on behalf of client devices that are distinct from the server 120. The server 120 may be implemented by a webserver, database server, FTP server, or other machine to provide services to the client devices 102 as clients. For example, the server 120 may be implemented by a mainframe computer, workstation, desktop computer, notebook computer, distributed computing network, supercomputer, or any multiple or combination of the foregoing. A variety of servers are commercially available from companies such as Hewlett Packard™, IBM™, Dell™, Sun™, and Apple™.

In one embodiment, and as explained in greater detail below, the server 120 may comprise equipment that is operated by one entity, such as a company, on behalf of client devices 102 that are subscriber-customers of the operating entity. In this embodiment, the server 120 is customized according to the needs of the operating entity and its client devices 102. In a different embodiment, some or all components of the server 120 may be satisfied by a publicly available search engine such as Google™, Yahoo™, Bing™, and the like, which may or may not be customized to suit the client devices.

In the illustrated example, the server 120 includes a manager 122 coupled to an engine 132 and a vocabulary collection 124. The engine 132 is coupled to a corpus 134, comprising a body of documents containing text. As explained below, the corpus 134 may offer certain advantages if it is updated frequently. Therefore, the server 120 may be configured to repeatedly supplement, expand, revise, or otherwise update the corpus as described in greater detail below.

In a specific example, each constituent document of the corpus may be a web page, web site, book, anthology, collection of readings, paper, publication, or a collection or combination of any of the foregoing or different types of documents without limitation. In an example, the corpus 134 is a large set of electronically stored and processed texts. As discussed in greater detail below, the effectiveness of certain operations may be increased by using a large corpus. Therefore, suitable means maybe used to prepare the corpus 134, such as using an automated indexer, web crawler, reader, scanner, or other software. In a further example, the corpus 134 may comprise an n-gram corpus that a publicly available search engine such as Google™ has released for public consumption.

In a different example, a publicly available search engine 140 is used instead of, or in addition to, the engine 132. The search engine 140 comprises an engine for searching Internet-accessible documents, which include but are not limited to web accessible hypermedia documents. In this embodiment, an external corpus 142 is used instead of, or in addition to, the corpus 132; here, the external corpus 142 comprises the body of documents that are searchable with the external search engine 140. Continuing with this same example, one example of the external corpus 142 is the entirety of documents accessible by Google™ or another search engine. In this example, the external corpus 142 is not part of the server 120. In still another example, the server 120 employs the pre-existing, external corpus 142, and uses the engine 132 to search the corpus 142 instead of the external engine 140.

The corpus 134 and/or the corpus 142 are shared or common in the sense that the server 120 accesses the corpus 134 and/or 142 on behalf of a multiple devices such as device 102.

As mentioned above, the vocabulary collection 124 includes multiple vocabularies, which in the present example include vocabularies 126, 128. Each vocabulary pertains to a stated topic, and in one example comprises a listing of words or n-grams corresponding to the topic. In the illustrated example, the vocabulary 126 relates to European soccer and the vocabulary 128 relates to Thanksgiving Cooking. Although two vocabularies 126, 128 are shown in this example, implementations may include dozens or hundreds or more of the vocabularies. The contents, organization, and use of the vocabularies is discussed in greater detail below.

The vocabularies in 124 may further include at least one vocabulary that includes or is dedicated to profanity. Since the vocabularies 124 are downloaded to client devices based on the language used of the device user (as explained in greater detail below), this arrangement provides a benefit in that the profanity vocabulary is only provided to users that would appreciate it. Furthermore, the server 120 may require the device user to opt-in to receive the profanity vocabulary to avoid distributing it unwanted. In a different or additional embodiment, receipt of such a vocabulary by a device 102 may depend upon the device, one or more applications running on the device, age or another property of a predefined user profile, etc.

As with the corpus 134, the vocabulary collection 124 may be repeatedly supplemented, expanded, revised, or otherwise updated by the server 120 as described in greater detail below.

In an embodiment, use of the vocabulary collection 124 (as described below) may be limited to certain devices 102, or even omitted entirely, in which cases the affected devices 120 will use their on-board vocabularies such as 112, 114 without any updates from the server 120. As an example, the server 120 may limit services concerning the vocabulary collection 124 to devices with a subscription agreement.

Implementation of Data Processing Entities

There are various data processing components in the system 100, such as the processor 108, manager 122, engine 132, engine 140, and the like. Furthermore, other components of the system 100 may include smart features, and in this respect, include some data processing features. Some examples include the collection 124, corpus 134, corpus 142, link 130, storage 110, user input device 106, and display 104. In any of these cases, such data processing features may be implemented by one or more hardware devices, software devices, a portion of one or more hardware or software devices, or a combination of the foregoing. The makeup of these subcomponents is described in greater detail below, with reference to FIGS. 2-4.

Exemplary Digital Data Processing Apparatus

Figure 2:
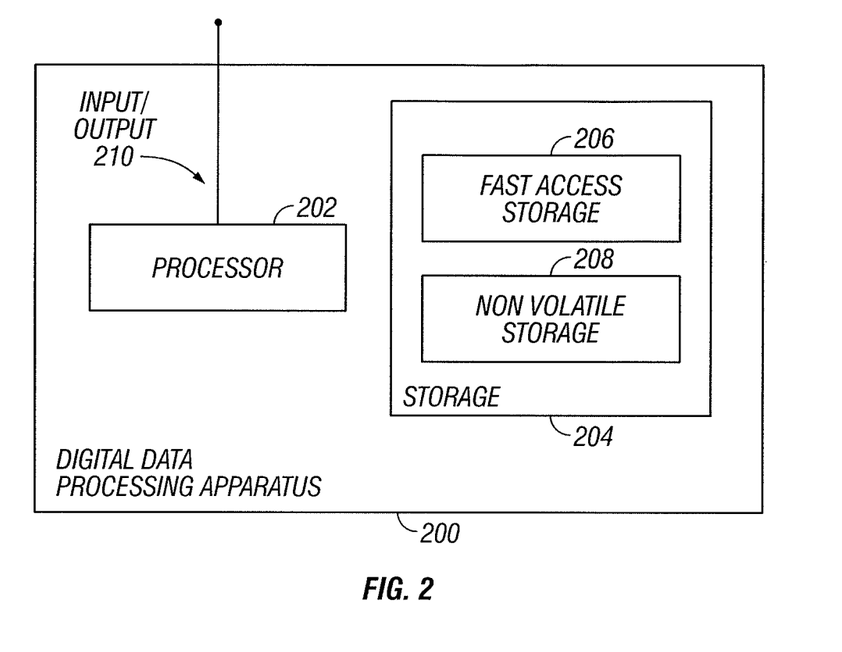
FIG. 2 is a block diagram of a digital data processing machine according to one embodiment of the invention.
Figure 3:
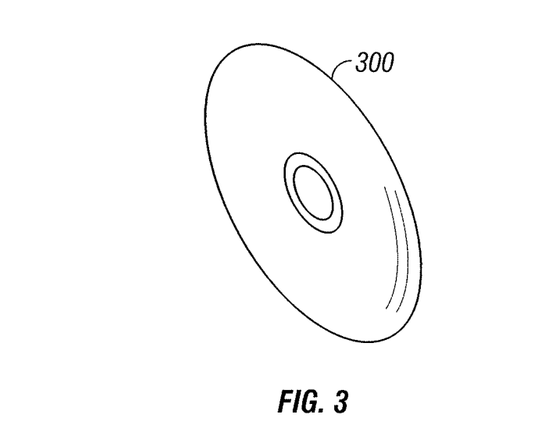
FIG. 3 shows an exemplary storage medium according to one embodiment of the invention.

As mentioned above, the various data processing entities of FIG. 1 may be implemented by various processing engines. FIG. 2 shows one example, in the form of a digital data processing apparatus 200. The apparatus 200 may be implemented by a personal computer, customer circuit board, workstation, notebook computer, controller, microcontroller, state machine, or other processing machine appropriate to the requirements of the tasks explained herein. The apparatus 200 includes a processor 202, such as a microprocessor, controller, microcontroller, digital signal processor (DSP), application specific integrated circuit (ASIC), field programmable gate array (FPGA) or other programmable logic device, discrete gate or transistor logic, discrete hardware components, or any combination thereof designed to perform the functions described herein. The processor 202 may also be implemented as a combination of computing devices, such as a combination of a DSP and a microprocessor, a plurality of microprocessors, one or more microprocessors in conjunction with a DSP core, or any other such configuration.

The processor is coupled to digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to provide storage such as 110, 124 or other storage used by the system 100 (FIG. 1), to embody the storage 204 and 208 (FIG. 2), or to provide storage in instances not specifically discussed or illustrated. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

Figure 4:
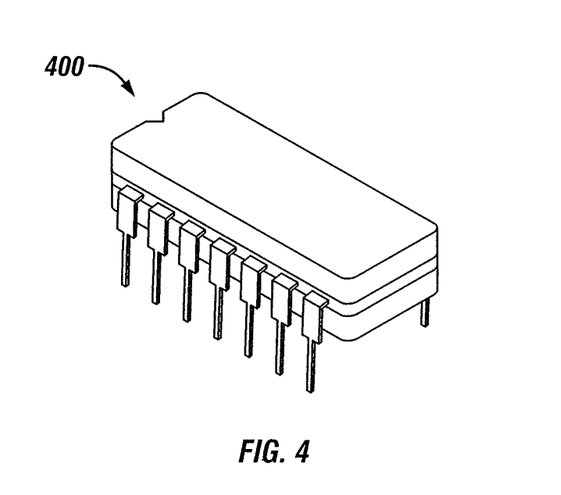
FIG. 4 is a perspective view of exemplary logic circuitry according to one embodiment of the invention.

In contrast to storage media that contain machine-executable instructions, as described above, a different embodiment uses logic circuitry to implement one or more data processing entities from FIG. 1. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like. FIG. 4 shows an example of logic circuitry in the form of an integrated circuit 400.

Operation

Having described the structural features of the present disclosure, the operational aspects of the disclosure will now be described. The steps of any method, process, or algorithm described in connection with the embodiments disclosed herein may be embodied directly in hardware, in a software module executed by hardware, or in a combination of the two.

Data Management at Server

Introduction

Figure 5:
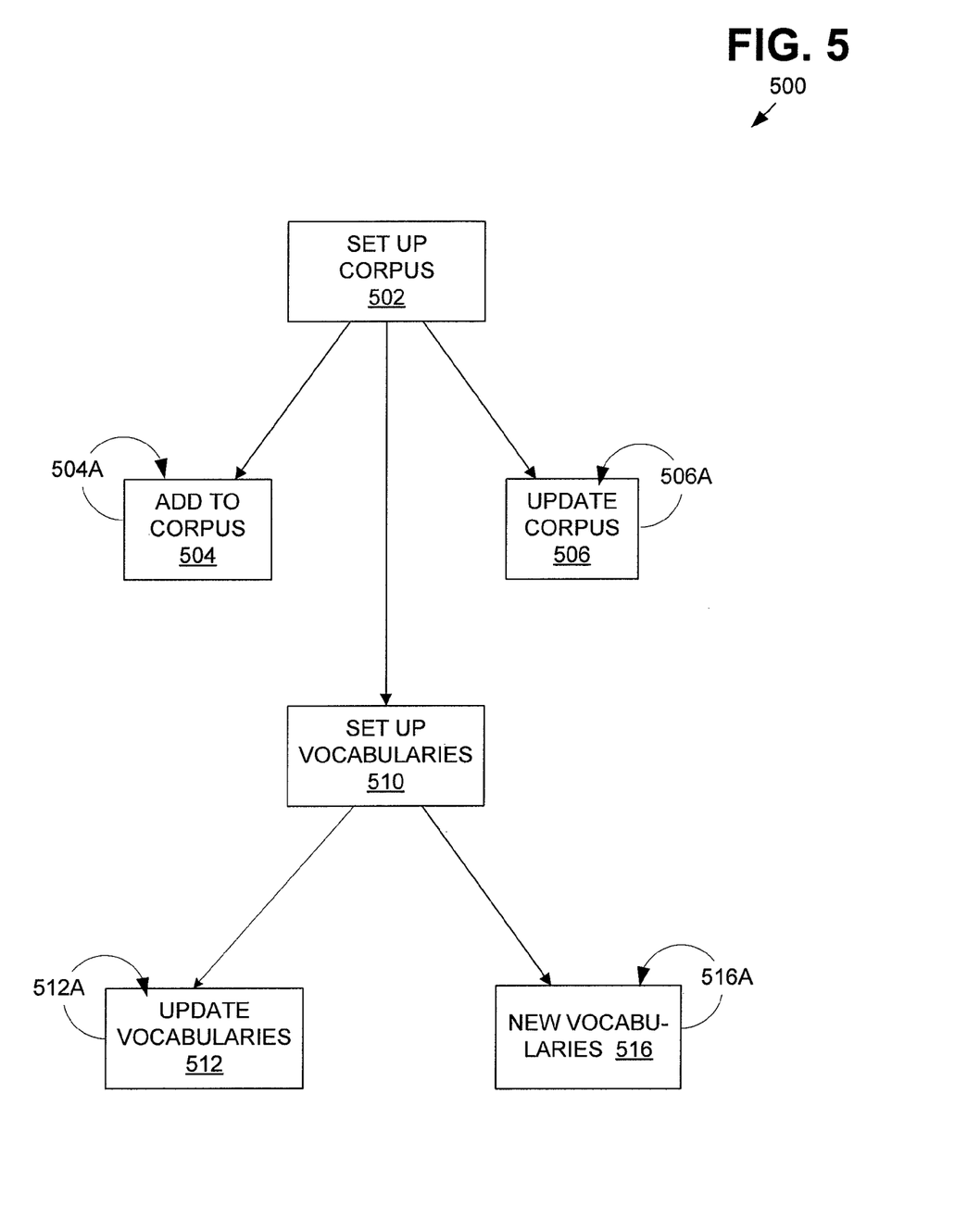
FIG. 5 is a flowchart for managing a corpus and vocabularies at a server according to one embodiment of the invention.

FIG. 5 shows operations 500 illustrating one example of the method aspect of this disclosure. The operations 500 serve to establish and maintain bodies of data for use in serving certain requests from remote mobile computing devices. For ease of explanation, but without any intended limitation, the example of FIG. 5 is described in the specific context of the system 100 described above.

In step 502, the server 120 establishes the corpus 134. In step 510, the server 120 establishes the vocabulary collection 124. Steps 502, 510 may be performed in a different order than described.

Step 502

One aspect of step 502 involves choosing which combination of corpus and engine to be used by the server 120. In an example, this is performed by personnel programming or configuring the server 120 at a suitable time, such as initial configuration or startup of the server 120, and re-performed as needed upon any reconfiguration, etc.

Another aspect of step 502 includes combing Internet-accessible documents to collect data and storing the compiled data in the corpus 134. These sources include web-accessible sources, Internet-accessible non-web sources, or both. Alternatively, or in addition, Internet-inaccessible sources may be used as sources for the corpus 134, where the engine 132 carries out step 502 by loading and accessing documents on CD-ROM or DVD or other storage media, scanning paper documents, etc. This component of step 502 may be carried out by an automated indexer, crawler, reader, scanner, or other software component of the engine 132.

In a different example, a pre-existing external corpus such as 142 is used. In this example, the engine 132 in step 502 may employ an automated indexer, web crawler, or other software to index the existing corpus 142 for faster access by the server 120.

In still another example, the corpus 134 comprises a published corpus of a search engine, such as the n-gram corpus published by Google™, and step 502 copies the published corpus to 134.

In a different example, instead of the engine 132, the manager 122 employs an external search engine 140 and its pre-indexed corpus 142. Here, the corpus 142 includes the body of Internet-accessible documents accessible to a particular search engine 140, and manager 122 in step 502 establishes a mechanism to refer future searches (explained below) to the search engine 140. This mechanism comprises a pointer, communications link, subroutine call, API, or other reference to the search engine 140.

Step 504

As explained in greater detail below, the server 120 performs searches on behalf of clients such as the device 102. In the case of the client device 102, these searches are initiated, at least in part, by the server 120 receiving copies of text input strings being entered at user input devices 106. In this context, step 504 involves the engine 132 updating the corpus 134 by adding the content the user's text input strings. Therefore, over time, the corpus 132 will collect an increasing body of the text entered upon the client device 102 and many other mobile computing devices in the system 100. And, as explained in greater detail below, this permits the corpus 134 to quickly adjust to current events, trends, news, fads, changes in language, new vocabulary, popular culture, and the like.

In an example, step 504 is performed regardless of whether an off-site search engine 140 and corpus 142 are used because it is beneficial to use a local corpus such as 134, which is repeatedly appended to include user's text strings. Step 504 is repeated on a periodic or event-driven or schedule-driven or as-needed basis, as illustrated by 504a.

Step 506

Step 506 is performed in the embodiment that uses a local corpus 134. Namely, it is beneficial from time to time for the engine 132, manager 122, or another component of the server 120 to re-execute the crawler, automated indexer, reader, scanner, or other software component that created the corpus 134 in order to ensure that it stays up-to-date. This involves adding new content to the corpus 134, or in the event an off-site corpus 142 is used with a local index, then step 506 involves appropriate re-indexing operations.

If an off-site corpus 142 and search engine 140 are used, then the operations of maintaining a local index at the server 120 may be omitted, since the corpus 142 is automatically updated by crawlers associated with the entity that operates the search engine 140.

Step 506 is repeated on a periodic or event-driven or schedule-driven or as-needed basis, as illustrated by 506a.

Step 510

In step 510, the server 120 establishes one or more of the vocabularies in the collection 124. As mentioned above, each vocabulary in the collection 124 is a listing of words or n-grams corresponding to a particular topic. In the illustrated example, the vocabulary 126 relates to European soccer and the vocabulary 128 relates to Thanksgiving Cooking. Table 1, below, shows an example of the vocabulary 126.

TABLE 1

| Manchester | international | offside |
| league | game | field |
| MLS | victory | net |
| player | defense | mark |
| Balotelli | trailing | bounds |
| Fabregas | score | sidelines |
| Casillas | team | referee |
| premier | decision | midfielder |
| stadium | penalty | line |
| home | assist | hook |
| squad | tackle | head |
| goal | football | foul |
| club | clock | official |
| coach | offense | period |

In one example, the vocabularies are prepared manually by personnel affiliated with an entity that operates the server 120. In a different or additional embodiment, a social networking, online bulletin board, or other community group may be created or enrolled to collectively assemble a vocabulary list for a specialized topic. In another example, for certain topics such as News, related vocabularies may be prepared by the manager 122 performing automated operations including compiling terms from relevant sources.

Step 512

In step 512, the server 120 updates one or more of the vocabularies to keep them fresh. Step 512 may be performed to supplement or correct or otherwise revise one or more of the vocabularies 124. This may be performed using any of the techniques discussed above in step 510. Step 512 is repeated on a periodic or event-driven or schedule-driven or as-needed basis, as illustrated by 512a.

Step 516

Step 516 creates one or more new vocabularies under certain circumstances. This may be performed using any of the techniques discussed above in step 510. In one example, step 516 is performed in order to create a vocabulary for a new topic that has arisen, become relevant, or come to the attention of the people or equipment affiliated with the server 120. In other examples, step 516 is performed if one of the vocabularies 124 becomes corrupted, is lost, or the content diverges from the original intent such that the vocabulary is not as effective as it should be. Step 516 is repeated on a periodic or event-driven or schedule-driven or as-needed basis, as illustrated by 516a.

Word Prediction, Completion, and/or Correction

Figure 6:
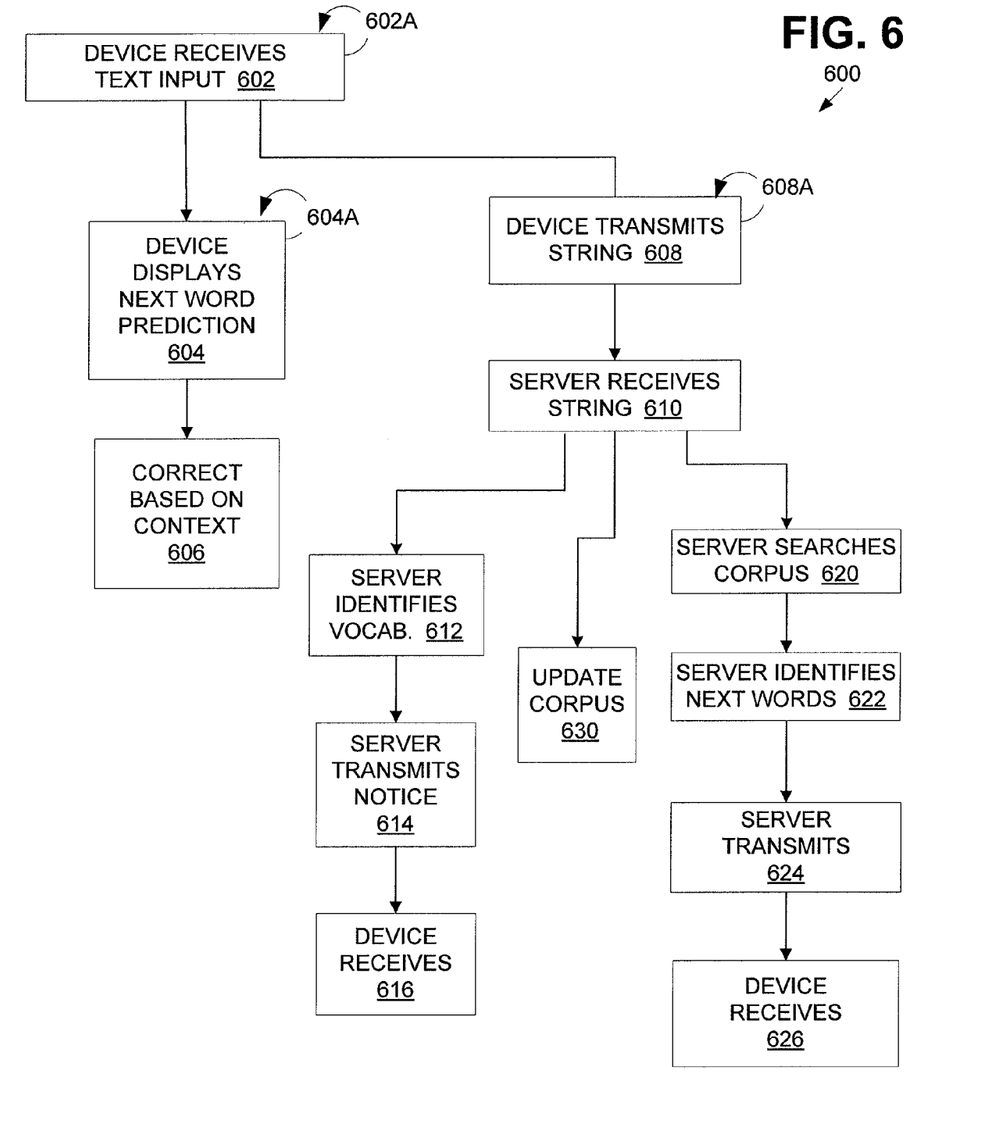
FIG. 6 is a flowchart depicting a method for text entry with word prediction, completion, and/or correction supplemented by search of shared corpus according to one embodiment of the invention.

FIG. 6 shows a sequence 600 illustrating one example of the method aspect of this disclosure. This sequence 600 facilitates text entry on a mobile computing device, where word prediction, completion, and/or correction is supplemented by searching a shared corpus. For ease of explanation, but without any intended limitation, the example of FIG. 6 is described in the specific context of the system 100 described above.

Receiving Text Input

In step 602, the client device 102 receives text input via the user input device 106. In the illustrated example, this may include one or more letters or other characters or symbols, one or more words, sentences, numerical strings, alphanumerical strings, or another unit of text. As shown by 602a, step 602 is performed on an ongoing basis, and namely, whenever the user enters text. In one example, step

602 stores the received text input in a buffer that is a standalone storage component of the client device 102, part of the storage 110, or integrated elsewhere into the device 106 or the processor 108.

After step 602, the device 102 conducts various operations of prediction and correction, as discussed in steps 604, 608 below. Also, after step 602 the device 102 transmits text input to the server 120, which is also discussed in greater detail as follows.

Transmission to Server

In step 608, the client device 102 transmits some or all of the buffered text to the server 120. The transmitted text is illustrated by reference 136 in FIG. 1. In one example, each transmission 608 to the server includes the most recent portion of the buffered text 602, such as the last five words entered by the user, or two hundred characters, or another volume of data. Therefore, in this example, the transmission occurring in step 608 is comprehensive rather than merely including the new text typed by the user. In other words, each transmission 608 to the server 120 contains the complete portion (such as most recent portion) of the buffered text 602 so that the server 120 can treat the transmissions as being independent of each other. In an embodiment, if the user is engaged in entering word, the transmitted text includes the symbols entered so far.

In one example, step 608 is performed repeatedly, as shown by 608a. For example, the device 102 may be programmed to perform step 608 after each keypress, completed word, space or other delimiter, or other unit of user input from step 602, or upon another time or period or schedule or event-driven basis. In another example, step 608 is performed after each keypress, but if the processor 108 detects that the user is typing faster than a prescribed rate, then the device 102 only performs step 608 after each word or another reduced basis. As an alternative to detecting user typing rate, the server 120 may be determine if a client has multiple requests queued up, and if so, to cancel all but the most recent one.

The transmission 136 may imply or expressly state an instruction requesting the server 120 to assist with vocabulary management and/or facilitate word prediction, completion, and/or correction as described below.

In one embodiment, various client devices such as 102 subscribe to services from the server 120. These devices are programmed, hard-wired, or otherwise configured to interact with the server 120, inducing the foregoing act of transmitting text strings to the server 120 in step 608.

Receipt at Server

In response to each instance of step 608, the server 120 in step 610 receives the string 136 transmitted in step 608. Responsive to receiving the string 136, the server 120 begins these different procedures: (1) supporting vocabulary management in steps 612-616, (2) updating the corpus in step 630, and (3) supporting word completion and/or prediction in steps 620-626.

Since the device 102 is repeatedly transmitting text strings as shown in step 608a, step 610 and the following steps 612-616, 630, and 620-626 may occur on a similarly repeating basis. Accordingly, step 610 and the subsequent steps may be ongoing while the client device 102 continues to receive text input from the user in expansion of the current text string.

As used herein, word prediction is used to broadly refer to the act of predicting the next word (if there is no active word being entered) and the act of predicting the completion of the current word if one is actively being entered. In the case of a word being actively entered, the result set may be filtered based on the current input, for example.

Vocabulary Management

Steps 612-616 perform operations of vocabulary management. These steps may be omitted or skipped for some devices, such as for devices lacking a subscription, or for all devices entirely.

In the event steps 612-616 are invoked, then in step 612 the manager 122 or another appropriate component at the server 120 determines whether there are any vocabularies in the collection 124 that pertain to the text string received from the client device 102 in step 608. This analysis may be conducted, for example, by the manager 122 determining whether words in the received text string significantly overlap the words of any of the vocabularies 124. An alternative or additional embodiment of step 612 includes computing a confidence measure between each vocabulary and the current text string, where step 612 identifies any vocabularies with a confidence measure above a prescribed threshold. An alternative or additional consideration is whether the text string significantly overlaps one vocabulary while lacking significant overlaps with some or all of the other vocabularies.

If there is a sufficient overlap with a given vocabulary of 124 as explained in the previous examples, then the server 120 in step 614 transmits notice to the device 102 that the given vocabulary is available. In step 616, the device 102 receives the notice transmitted by the server 120, and manually or automatically downloads the vocabulary from the server 120 if appropriate to device-local considerations such as whether the storage 110 already contains the vocabulary, device 102 workload, available bandwidth, user confirmation, available storage, etc.

The transmitted vocabulary is exemplified by 138 in FIG. 1. In one example, the device 102 may store the new vocabulary in the storage 110, and thereafter automatically start to use it along with the existing vocabularies 112, 114 during future text entry operations such as word prediction, completion, and/or word correction. In the case of a profanity vocabulary, step 614 or other subsequent operations may require the client device 102 to opt-in or accept before the server transmits such a vocabulary.

As an alternative to the notify-and-download scenario discussed above, the server 120 may automatically transmit the vocabularies identified in step 612 to the device 102.

Here is an example of how steps 612-616 may be carried out in actual practice. First, step 612 finds that the device-submitted text string from 608 overlaps the existing vocabulary 126 concerning European Soccer because the text string included "score" and "stadium" and "Balotelli." Accordingly, in step 614 the server 120 transmits notification to the device 102 that the vocabulary 126 is available. In step 616, the device 102 receives the notice, downloads the vocabulary 126 to storage 110 at an appropriate time, and thereafter starts to use the vocabulary in performing device-local tasks such as word prediction, completion, and/or correction. The vocabulary 126 enables the device 102 to provide word prediction, completion, and/or correction proposals more accurately and quickly, since the storage 110 now contains a local vocabulary specifically suited to the topic that the user is currently typing about.

Searching

As mentioned above, steps 620-626 concern operations to support word prediction, completion, and/or correction at the device 102. Responsive to receiving the text input string step 610, the server 120 conducts a search of the implemented corpus using the text input string as a contiguous search term to yield results including one or more instances of the string in context of the corpus.

More particularly, the search is conducted using the engine 132 and the corpus 134 and/or corpus 142, or using the engine 140 with the corpus 142. This depends upon the manner in which the server 120 is implemented, as discussed above. For the current example, the embodiment is discussed where the server engine 132 searches the corpus 134.

Namely, the engine 132 searches the corpus 134 using the string that was transmitted in step 608. This search yields results that include one or more instances, but more likely multiple instances, of the searched string in the context of the corpus. More particularly, the search yields results that include one or more instances of the searched string immediately followed by one or more subsequent words. For example, using the string "low pressure followed by," the search result may include instances of the string in the corpus, immediately followed by one or more additional words, as shown in TABLE 2, below.

TABLE 2 low pressure followed by a selective distillation
low pressure followed by heavy northwest gales
low pressure followed by ramped or staged pressure
low pressure followed by high pressure
low pressure followed by decreasing clouds
. . .

A different example, shown in TABLE 3 below, shows the case where the user is actively involved in entering the yet-incomplete word "followed", so that the relevant text string currently includes only "low pressure fo".

TABLE 3 low pressure fog nozzles
low pressure fogging system
low pressure forecast
low pressure food
low pressure foaming machine
. . .

To improve the results, step 620 may use the longest possible contiguous string that yields results. Step 620 may be carried out using, for example, a single thread binary search of different string lengths (word based) or a multi thread search of the most likely lengths at the same time. The latter can yield an improved device response time.

In one example of step 620, the server 120 may automatically drop a word from the leading edge of the contiguous search string and repeat the search if the search results do not yield any or a sufficient number of results. For example, if there are no search results for "distinct frontal band with increasing low pressure followed by," then the server 120 may automatically repeat the search for "frontal band with increasing low pressure followed by." In one example, the server 120 may repeat the action of dropping leading-edge words until the search yields meaningful results.

In step 622, the engine 132 identifies and selects the next words following some or all of the instances of the string in the corpus, in order to send these to the client device. If the text string ends in an incomplete word, as in TABLE 3, then these "next" word identified in step 622 also include completion of the current word.

Each group of next words may be referred to as a "set." In the example of TABLE 2, the server 120 identifies a first set of next words including "a selective distillation . . . " and second set including "heavy northwest gales . . . " a third set including "ramped or staged pressure . . . " and so on. In the example of TABLE 3, the server 120 identifies a first set of next words including "g nozzles," a second set including "gging system," a third set including "recast," and so on. Thus, each set occurs in the corpus immediately after the contiguous text string used as the search term.

If there are a large number of search results, the server 120 may limit selection according to random selection or a more structured approach such as one of the ranking strategies discussed below.

In step 624, the server 120 transmits the selected sets to the client device 102. These are exemplified by 139 in FIG. 1. In other words, the server 120 transmits the identified next words via the link 130 for local use upon the device 120 as discussed in greater detail below. In one example, the manager 122 may limit the transmitted words of each set to a fixed number of next words, such as four.

In step 626, the device 102 receives the transmitted sets, and implements them locally during the next performance of step 604 as discussed below. For instance, the device 102 may immediately display a user-selectable listing of some or all of the sets, each forming a prediction of one or more next words and/or the completion of the current word. More particularly, the device 120 may display one or more of the sets as completion of the word being currently entered via the user input device, or as predictions of one or more next words to be entered via the user input device.

As an alternative to the automatic transmission of search results in step 624, the server 120 may transmit notification of the search results being available for the device to download.

Ranking

In one example of step 622, the server 120 may rank the word sets found from the search results according to various criteria, such as number of appearances of each set in the search results, the proximity of a set to the top of the search results list, etc. This ranking may be used to select which sets are transmitted to the client device 102, for example if there are a large number of search results. As an additional, or alternative example, the server 120 may transmit notice of the rankings to the client device 102, whereupon the client device 102 orders next word predictions, completions, and/or current word completions based on these rankings.

As a further alternative or enhancement to such ranking techniques, step 622 may use the following approach to further rank the search results. In this example, step 608 is implemented such that each transmission from device 102 to server 120 further includes items such as a representation of various keys likely struck by the user, and the probability that each key was struck, character neighbors, alternate characters, and the like. This accommodates soft keyboards and also accommodates keypress error for both soft and hard keyboards. Some examples for determining these probabilities are disclosed in U.S. patent application Ser. No. 12/939,918 entitled SPELL-CHECK FOR A KEYBOARD SYSTEM WITH AUTOMATIC CORRECTION, filed on Nov. 4, 2010 in the name of Erland Unruh. The entirety of the foregoing patent application is hereby incorporated herein by reference. In contrast to the foregoing example, the transmission of step 608 may define the locations of the key strikes or a path traced over a soft keyboard, whereupon the server 120 resolves the various keypress probabilities.

Continuing with this example, the server 120 performs the set-edit-distance computations described in the '918 patent application upon the word being currently entered by the user current, with the vocabulary for the set-edit-distance being the word sets from the search results of step 622. The words in the search results are, therefore, ranked according to their set-edit-distance. Other comparison properties such as free adds and deletes, keypress probabilities, and the like may be used to refine the search results.

Updating Corpus

As mentioned above, step 610 is followed by steps 612-616, step 630, and steps 620-626. Steps 612-616 and steps 620-626 were discussed above.

In step 630, the server 120 updates the corpus 134. Namely, the manager 122 takes the string received in step 608 and appends the corpus 134 with this string. Thereafter, the stored string will serve as corpus for future searches by this device 102 and others. And further, when the device 102 and other devices display word predictions, completions, and/or corrections in step 604 (as discussed below), this will include displaying words that were added to the corpus from others' devices. This permits the corpus 132 to quickly adjust to current events, trends, news, fads, changes in language, popular culture, and the like, based on what people are typing into their devices.

Word Prediction

As mentioned above, based on information including text input received in step 602, the client device 102 in step 604 performs word prediction and/or completion. Namely, the client 102 displays the text input received from the server 602 in one or more lists as proposals for the next and/or current word to be entered. The device 102 presents the proposed text in a user interface enabling the operator of the device 102 to select a word (and/or word completion) from the list, whereupon the word is entered into the user's text.

Current and/or next word prediction in step 604 may employ techniques such as described in the following publications: (1) U.S. Pat. No. 5,818,437 issued on Oct. 6, 1998 entitled REDUCED KEYBOARD DISAMBIGUATING COMPUTER, (2) U.S. Pat. No. 7,679,534 issued on Mar. 16, 2010 entitled CONTEXTUAL PREDICTION OF USER WORDS AND USER ACTIONS, (3) Radiology Report Entry with Automatic Phrase Completion Driven by Language Modeling, by Eng and Eisner, Radiographics, 24, 1493-1501 (September 2004). The entirety of the foregoing publications are incorporated herein by reference in their entirety.

Step 604 may be repeated as shown by 604a. In one example, step 604 is repeated each time the device 102 receives a new keypress, symbol, character, word, space, predefined delimiter, or other unit of text. Furthermore, step 604 may be repeated or updated every time the device 102 receives a vocabulary from the server 120, according to step 616. Step 604 may be further repeated whenever the device 102 receives search results from the server 120, according to step 626 discussed above.

In one example, the processor 108 may limit display of word prediction/completion candidates if the processor 108 detects that the user is typing faster than a prescribed rate, in which case the device 102 only performs step 604 after each word or another reduced basis. In a different example, the device 102 applies word prediction/completion whenever there are no active keypresses, such as when the user has entered a space or delimiter or a punctuation mark ending a sentence. As an alternative or addition to the prescribed rate approach, the server 120 may be determine if a client has multiple requests queued up, and if so, to cancel all but the most recent one. In a different example, the device may maintain the latest known result and apply it as much as possible until the next result arrives and likely replaces it.

As the user continues to add more text, the device 102 refines the word prediction/completion candidates being presented to the user by removing candidates that are no longer consistent with the user's continued text input.

In addition to the text received from the server 120, the word prediction/completion of step 604 may also employ one or more of the local vocabularies such as 112, 114. Proposals from the vocabularies 112, 114 may be combined with the text from the server 120 (via step 626), or presented separately. In one example, the device 102 relies on a primary one of the vocabularies for most word prediction/completion tasks. The primary vocabulary may be built-in or auto-installed to the device 102, for example. As for any supplementary vocabularies, such as vocabularies downloaded from the server 120, the device 120 may consider these in combination with the primary vocabulary as a contiguous body of words, or the downloaded vocabularies may be used for a separate purpose such as ranking next word and word completion proposals to the user. For instance, if a device 102 has downloaded a vocabulary concerning European Soccer due to the user's penchant for soccer discussions, then the device 102 may employ this vocabulary in recognizing soccer related words and including or promoting them in the word predictions/completions proposed to the user.

One of many benefits of downloading new vocabularies in real time, as discussed in steps 614-616 above, is that the user's vocabulary can be updated in real time based on the topic that the user is typing about.

Where the word sets received from the server 120 in step 626 are ranked, step 604 may be performed such that the device 102 orders the next word predictions or current word completions displayed to the user based on these rankings.

One of many benefits of adding users' search terms to the corpus in step 630, as described above, is that when the server searches the corpus 620 in step 620, the search also includes these additions in the search results. So, if many users start to discuss an unusual word such as "tsunami" or "Obama" or a coined word such as a new product, then these words will start to appear in search results 622 nearly immediately. Consequently, these words are made available to the device 102 in steps 624, 626, and included in the word prediction/completion conducted in step 604.

In one example, the device may update the display of word prediction/completion candidates after new key presses from the user. In an additional or alternative example, the device may update the display of word prediction/completion candidates whenever results arrive from the server 120 according to step 626.

Input Correction

In addition to word prediction/completion, or instead of it, the device 102 may apply other types of correction. For instance, step 606 may perform reordering or correction of already-entered text based on prediction. For example, in a string including multiple words, context based correction includes corrections to one or more of the words based on context including words subsequent to the corrected word, not just previously entered words. In this example, the device 102 may change words around the one that the user is entering while the user is still typing. This is useful for many purposes, including correcting instances where the letter S is transposed, that is, missing from the end of one word and mistakenly entered at the start of the next word.

For example, a sentence that begins with the twelve-key entry "4663" is ambiguous because it represents both "good" and "home," and cannot be resolved based on normal n-gram prediction where this is the first word in the message. However, such entries can be resolved under step 606 because subsequently entered user input is available to resolve previously entered user input.

In this embodiment, the device 102 maintains and visualizes a larger "area" of user input to communicate that words are preliminary and allow them to change when more information/context is available. In an example, the device 102 does not permit all entered text to change, as there are automatic and/or manual selections for locking in text. Limitations may apply when the user adds or edits "inside" already written text. And although text may be likely "locked" from earlier, all new input and edits may be subject to "delayed/lazy" prediction of what has been and is being written.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiments are representative of the subject matter which is broadly contemplated by the invention, and the scope of the invention fully encompasses other embodiments which may become obvious to those skilled in the art, and that the scope of the invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

The claimed invention is:

1. A method for any of word prediction, word completion, or word correction at a client device, the client device having a memory and a processor in communication with the memory, wherein the processor performs the method comprising:
storing a local primary vocabulary at the client device, wherein the local primary vocabulary pertains to any of a language, a subject matter, a functional purpose, or a content;
receiving a sequence of one or more symbols from a user through entry of a sequence of keypresses by the user;
transmitting at least a most recent portion of the sequence over a network after each of the keypresses;
updating the locally stored primary vocabulary from a corresponding remote vocabulary of a plurality of remote vocabularies over the network that pertains to the transmitted most recent portion of the sequence after each of the keypresses, when the transmitted portion of the sequence includes one or more words that overlaps both the corresponding remote vocabulary and the locally stored primary vocabulary;
receiving a new vocabulary of the plurality of remote vocabularies over the network that pertains to the transmitted most recent portion of the sequence after each of the keypresses, wherein the new vocabulary pertains to a topic, wherein the new vocabulary includes a plurality of words that correspond to the topic, when the transmitted most recent portion of the sequence includes one or more words that overlap the new vocabulary, such that the new vocabulary has associated therewith a measure of confidence above a prescribed threshold with respect to the transmitted most recent portion of the sequence, wherein the transmitted most recent portion of the sequence significantly overlaps the new vocabulary while lacking significant overlaps with the locally stored primary vocabulary and others of the plurality of remote vocabularies, wherein receiving the new vocabulary comprises
receiving a notice over the network that a new vocabulary is available that pertains to the transmitted sequence, and
downloading the new vocabulary over the network in response to the received notice;
locally storing the received new vocabulary at the client device;
receiving text entered by the user; and
for the received text, using the updated locally stored primary vocabulary or the locally stored new vocabulary for any of word prediction, completion, or word correction.

2. The method of claim 1, further comprising:
pre-defining a profile for the user;
wherein the received new vocabulary depends on a property of the pre-defined user profile.

3. The method of claim 1, wherein the received new vocabulary is based on any of a different language, a subject matter, a functional purposes, or a content.

4. The method of claim 1, wherein the received new vocabulary depends on any of the client device, an application running on the client device, and a property of the user.

5. The method of claim 1, wherein using the locally stored new vocabulary for any of word prediction, completion, or word correction comprises using the locally stored new vocabulary in combination with the locally stored primary vocabulary as a contiguous body of words.

6. The method of claim 1, wherein using the locally stored new vocabulary for any of word prediction, completion, or word correction comprises ranking next word and word completion proposals for the user.

7. The method of claim 1, further comprising:
transmitting an opt-in or acceptance from the user over the network to receive a new vocabulary that includes or is dedicated to profanity;
wherein the received new vocabulary includes or is dedicated to the profanity;
such that the received new vocabulary is only received by the user if wanted by the user, and is not received by the user if the new vocabulary is unwanted by the user.

8. The method of claim 1, wherein the receiving the new vocabulary is dependent on a subscription agreement for the client device.

9. A client device, comprising:
a processor programmed to perform operations including:
storing a local primary vocabulary at the client device, wherein the local primary vocabulary pertains to any of a language, a subject matter, a functional purpose, or a content;
receiving a sequence of one or more symbols from a user through entry of a sequence of keypresses by the user;
transmitting at least a most recent portion of the sequence over a network after each of the keypresses;
updating the locally stored primary vocabulary from a corresponding remote vocabulary of a plurality of remote vocabularies over the network that pertains to the transmitted most recent portion of the sequence after each of the keypresses, when the transmitted most recent portion of the sequence includes one or more words that overlaps both the corresponding remote vocabulary and the locally stored primary vocabulary;
receiving a new vocabulary of the plurality of remote vocabularies over the network that pertains to the transmitted most recent portion of the sequence after each of the keypresses, wherein the new vocabulary pertains to a topic, when the new vocabulary includes a plurality of words that correspond to the topic, and wherein the transmitted most recent portion of the sequence includes one or more words that overlap the new vocabulary, such that the new vocabulary has associated therewith a measure of confidence above a prescribed threshold with respect to the transmitted most recent portion of the sequence, wherein the transmitted most recent portion of the sequence significantly overlaps the new vocabulary while lacking significant overlaps with the locally stored primary vocabulary and others of the plurality of remote vocabularies, wherein receiving the new vocabulary comprises
receiving a notice over the network that the new vocabulary is available that pertains to the transmitted sequence, and
downloading the new vocabulary over the network in response to the received notice;
locally storing the received new vocabulary at the apparatus;
receiving text entered by the user; and
for the received text, using the locally stored vocabulary for any of word prediction, completion, or word correction.

10. The client device of claim 9, wherein using the locally stored new vocabulary for any of word prediction, completion, or word correction comprises using the locally new stored vocabulary in combination with the locally stored primary vocabulary as a contiguous body of words.

11. The client device of claim 9, wherein using the locally stored new vocabulary for any of word prediction, completion, or word correction comprises ranking next word and word completion proposals for the user.

12. The client device of claim 9, wherein the processor is further programmed to perform an operation of pre-defining a profile for the user, wherein the received new vocabulary depends on a property of the pre-defined user profile.

13. The client device of claim 9, wherein the received new vocabulary is based on any of a different language, a subject matter, a functional purposes, or a content.

14. The client device of claim 9, wherein the received new vocabulary depends on any of the client device, an application running on the client device, and a property of the user.

15. The client device of claim 9, wherein the processor is further programmed to perform an operation of
transmitting an opt-in or acceptance from the user over the network to receive a new vocabulary that includes or is dedicated to profanity;
wherein the received new vocabulary includes or is dedicated to the profanity;
such that the received new vocabulary is only received by the user if wanted by the user, and is not received by the user if the new vocabulary is unwanted by the user.

16. The client device of claim 9, wherein the receiving the new vocabulary is dependent on a subscription agreement for the client device.

17. A computer program product, tangibly embodied in a non-transitory computer-readable storage medium, the computer program product including instructions operable to cause a data processing apparatus of a client user input device to perform a method comprising:
storing a local primary vocabulary at the client device, wherein the local primary vocabulary pertains to any of a language, a subject matter, a functional purpose, or a content;
receiving a sequence of one or more symbols from a user through entry of a sequence of keypresses by the user;
transmitting at least a most recent portion of the sequence over a network after each of the keypresses;
updating the locally stored primary vocabulary from a corresponding remote vocabulary of a plurality of remote vocabularies over the network that pertains to the transmitted most recent portion of the sequence after each of the keypresses, when the transmitted portion of the sequence includes one or more words that overlaps both the corresponding remote vocabulary and the locally stored primary vocabulary;

receiving a new vocabulary of the plurality of remote vocabularies over the network that pertains to the transmitted most recent portion of the sequence after each of the keypresses, wherein the new vocabulary pertains to a topic, when the new vocabulary includes a plurality of words that correspond to the topic, and wherein the transmitted most recent portion of the sequence includes one or more words that overlap the vocabulary, such that the new vocabulary has associated therewith a measure of confidence above a prescribed threshold with respect to the transmitted most recent portion of the sequence, wherein the transmitted most recent portion of the sequence significantly overlaps the new vocabulary while lacking significant overlaps with the locally stored primary vocabulary and others of the plurality of remote vocabularies, wherein receiving the new vocabulary comprises     receiving a notice over the network that the new vocabulary is available that pertains to the transmitted sequence, and     downloading the new vocabulary over the network in response to the received notice;

locally storing the received new vocabulary at the client device;

receiving text entered by the user; and for the received text, using the updated locally stored primary vocabulary or the locally stored new vocabulary for any of word prediction, completion, or word correction.

18. The computer program product of claim 17, wherein using the locally stored new vocabulary for any of word prediction, completion, or word correction comprises using the locally stored vocabulary in combination with the locally stored primary vocabulary as a contiguous body of words.

19. The computer program product of claim 17, wherein using the locally stored new vocabulary for any of word prediction, completion, or word correction comprises ranking next word and word completion proposals for the user.

20. The computer program product of claim 17, wherein the method includes pre-defining a profile for the user, and wherein the received new vocabulary depends on a property of the pre-defined user profile.

21. The computer program product of claim 17, wherein the received new vocabulary is based on any of a different language, a subject matter, a functional purposes, or a content.

22. The computer program product of claim 17, wherein the received new vocabulary depends on any of the client device, an application running on the client device, and a property of the user.

23. The computer program product of claim 17, wherein the method further comprises:

transmitting an opt-in or acceptance from the user over the network to receive a new vocabulary that includes or is dedicated to profanity;

wherein the received new vocabulary includes or is dedicated to profanity;

such that the received new vocabulary is only received by the user if wanted by the user, and is not received by the user if the new vocabulary is unwanted by the user.

24. The computer program product of claim 17, wherein the receiving the new vocabulary is dependent on a subscription agreement for the client user input device.

* * * * *